US012159453B2

(12) United States Patent
Banerjee et al.

(10) Patent No.: US 12,159,453 B2
(45) Date of Patent: Dec. 3, 2024

(54) SYSTEM AND METHOD FOR ONTOLOGY GUIDED INDOOR SCENE UNDERSTANDING FOR COGNITIVE ROBOTIC TASKS

(71) Applicant: Tata Consultancy Services Limited, Mumbai (IN)

(72) Inventors: Snehasis Banerjee, Kolkata (IN); Balamuralidhar Purushothaman, Bangalore (IN); Pradip Pramanick, Kolkata (IN); Chayan Sarkar, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 346 days.

(21) Appl. No.: 17/815,109

(22) Filed: Jul. 26, 2022

(65) Prior Publication Data
US 2023/0162494 A1 May 25, 2023

(30) Foreign Application Priority Data

Oct. 22, 2021 (IN) .............................. 202121048303

(51) Int. Cl.
  *G06V 10/86* (2022.01)
  *B25J 9/16* (2006.01)
  (Continued)

(52) U.S. Cl.
  CPC .............. *G06V 10/86* (2022.01); *B25J 9/163* (2013.01); *G06V 10/426* (2022.01); *G06V 10/87* (2022.01);
  (Continued)

(58) Field of Classification Search
  CPC ...... G06V 10/86; G06V 10/426; G06V 10/87; G06V 20/50; G06V 20/35; G06V 20/56;
  (Continued)

(56) References Cited

U.S. PATENT DOCUMENTS 10,112,298 B2 * 10/2018 Lection .................. B25J 9/1697
10,460,033 B2 * 10/2019 Cohen ..................... G06N 3/042
(Continued)

FOREIGN PATENT DOCUMENTS

CN 112465144 A 3/2021

OTHER PUBLICATIONS

"Understanding Contexts Inside Robot and Human Manipulation Tasks through a Vision-Language Model and Ontology System in a Video Stream"; Jiang, Chen, https://arxiv.org/abs/2003.01163 (Year: 2020).*

(Continued)

Primary Examiner — Michael S Osinski
(74) Attorney, Agent, or Firm — FINNEGAN, HENDERSON, FARABOW, GARRETT & DUNNER LLP (57) ABSTRACT

Existing cognitive robotic applications follow a practice of building specific applications for specific use cases. However, the knowledge of the world and the semantics are common for a robot for multiple tasks. In this disclosure, to enable usage of knowledge across multiple scenarios, a method and system for ontology guided indoor scene understanding for cognitive robotic tasks is described where in scenes are processed based on techniques filtered based on querying ontology with relevant objects in perceived scene to generate a semantically rich scene graph. Herein, an initially manually created ontology is updated and refined in online fashion using external knowledge-base, human robot interaction and perceived information. This knowledge helps in semantic navigation, aids in speech, and text based human robot interactions.

15 Claims, 5 Drawing Sheets

(51) Int. Cl.
*G06V 10/426* (2022.01)
*G06V 10/70* (2022.01)
*G06V 20/50* (2022.01)

(52) U.S. Cl.
CPC .... *G06V 20/50* (2022.01); *G05B 2219/33318* (2013.01); *G05B 2219/39001* (2013.01)

(58) Field of Classification Search
CPC ...... G06V 10/82; G06V 10/764; G06V 20/70; G06V 10/454; G06V 10/84; G06V 20/41; G06V 10/255; B25J 9/163; B25J 9/1661; B25J 9/1697; G05B 2219/33318; G05B 2219/39001; G06N 20/00; G06N 5/022; G06N 3/045; G06N 3/08; G06N 3/044; G06N 3/084; G06N 3/042; G06N 3/0464; G06N 3/09; G06N 5/02; G06N 3/02; G05D 1/0016; G05D 1/0248; G05D 1/0088; G06F 40/30; G06F 18/214; G06F 18/24; G06F 40/205; G06F 40/284; G06F 40/279; G06F 16/55

See application file for complete search history.

(56) References Cited

U.S. PATENT DOCUMENTS

| | | | | |
|---|---|---|---|---|
| 10,997,231 | B2* | 5/2021 | McAuliffe | G06V 10/762 |
| 11,373,390 | B2 | 6/2022 | Zhao | G06F 18/2413 |
| 11,599,749 | B1* | 3/2023 | Ziaeefard | G06N 3/08 |
| 11,836,187 | B2* | 12/2023 | Kilaru | G06F 16/583 |
| 12,019,678 | B2 | 6/2024 | Moon | G06F 16/783 |
| 12,045,568 | B1* | 7/2024 | Shrivastava | G10L 15/30 |
| 12,056,458 | B2 | 8/2024 | Meng | G06F 40/51 |
| 2018/0018553 | A1* | 1/2018 | Bach | G06F 40/279 |
| 2019/0058887 | A1 | 2/2019 | Wang | G06V 20/46 |
| 2019/0370587 | A1* | 12/2019 | Burachas | G06T 11/60 |
| 2020/0005162 | A1 | 1/2020 | Kattepur | B25J 9/1612 |
| 2020/0039071 | A1* | 2/2020 | Sarkar | B25J 9/1682 |
| 2020/0151277 | A1* | 5/2020 | Fisher | G06T 17/00 |
| 2020/0193160 | A1* | 6/2020 | Lee | G06F 40/30 |
| 2020/0302231 | A1* | 9/2020 | Nawhal | G06F 18/211 |
| 2020/0356829 | A1* | 11/2020 | Costabello | G06F 40/56 |
| 2020/0394434 | A1* | 12/2020 | Rao | G06N 3/08 |
| 2021/0118442 | A1* | 4/2021 | Poddar | G06V 40/25 |
| 2021/0248375 | A1* | 8/2021 | Geng | G06F 16/9035 |
| 2021/0374489 | A1* | 12/2021 | Prakash | G06V 10/764 |
| 2022/0058429 | A1* | 2/2022 | Zou | G06V 10/761 |
| 2022/0198813 | A1* | 6/2022 | Chiu | G06V 10/82 |
| 2022/0309762 | A1* | 9/2022 | Zhao | G06F 18/2413 |
| 2022/0383037 | A1* | 12/2022 | Pham | G06N 3/09 |
| 2023/0080342 | A1* | 3/2023 | Roychoudhury | G06V 10/764 |
| | | | | 701/25 |
| 2023/0103305 | A1* | 4/2023 | Xu | G06F 40/205 |
| | | | | 382/156 |
| 2023/0127121 | A1* | 4/2023 | Henson | G06F 16/90335 |
| | | | | 706/12 |
| 2023/0236606 | A1* | 7/2023 | Banerjee | G05D 1/0274 |
| | | | | 701/25 |
| 2023/0394294 | A1* | 12/2023 | Chiu | G06N 3/092 |
| 2024/0096093 | A1* | 3/2024 | Chiu | G09B 19/003 |
| 2024/0112044 | A1* | 4/2024 | Kim | G06N 5/022 |
| 2024/0160929 | A1* | 5/2024 | Jia | G06N 5/022 |

OTHER PUBLICATIONS

Shao, Xi et al., "Automatic Scene Recognition Based on Constructed Knowledge Space Learning", IEEE Access, Date: May 2019, vol. 7, Publisher: IEEE, https://ieeexplore.ieee.org/stamp/stamp.jsp?arnumber=8723314.=8723314.

Gu, Jiuxiang et al., "Scene Graph Generation with External Knowledge and Image Reconstruction", Computer Vision and Pattern Recognition, Date: Apr. 2019, Publisher: Arxiv, https://arxiv.org/pdf/1904.00560.pdf.

Zhong, Yiwu et al., "Learning to Generate Scene Graph from Natural Language Supervision", Computer Vision and Pattern Recognition, Date: Sep. 2021, Publisher: Arxiv, https://arxiv.org/pdf/2109.02227.pdf.

* cited by examiner

FIG. 5

SYSTEM AND METHOD FOR ONTOLOGY GUIDED INDOOR SCENE UNDERSTANDING FOR COGNITIVE ROBOTIC TASKS

CROSS-REFERENCE TO RELATED APPLICATIONS AND PRIORITY

This U.S. patent application claims priority under 35 U.S.C. § 119 to Indian Application number 202121048303, filed on Oct. 22, 2021. The entire contents of the aforementioned application are incorporated herein by reference.

TECHNICAL FIELD

The disclosure herein generally relates to the field of cognitive robotics and more specifically, to a method and system for an ontology guided indoor scene understanding for cognitive robotic tasks.

BACKGROUND

The advent of low cost mobile robotic platform has seen a surge in usage of robots in our daily surroundings. The utility of a mobile robot has got expanded from personal usage to industries, shop floors, healthcare, and offices. Additionally, robots are equally used in collocated places and remote setups. The existing service robotic systems do not have a dedicated knowledgebase that can be updated and expanded using external knowledge as well as observations. Systems based on machine learning has an element of probability estimate errors and safety issues, whereas inclusion of commonsense and general knowledge can make decision making more semantically intelligent and reliable.

Ontology defines abstract concepts of a domain. The instances of the ontology form knowledgebase that ensures semantic interoperability of the knowledge among various applications (can be developed independently by different developers) of the domain. Considering the diverse range and ever evolving robotics applications, the ontologies need to be amended over time. Also, given the ontologies, the knowledgebase needs to be created by instantiating the classes and their properties as defined in the ontology for the environment where the robot is operating. This process is either done manually or automatically by collecting sensor-based data. With the change of the environment, the knowledgebase needs to be updated continuously, which should ensure consistency and non-conflict with the existing knowledge. It is important that when a robot interacts with a human being, the given knowledge needs to be grounded, i.e., both should have similar interpretation of the environment. Further, there is also problems in the existing cognitive robotics applications of building specific applications for specific use cases. However, the knowledge of the world and the semantics are common for a robot for multiple tasks.

SUMMARY

Embodiments of the disclosure present technological improvements as solutions to one or more of the above-mentioned technical problems recognized by the inventors in conventional systems. For example, in one embodiment, a method and system for an ontology guided indoor scene understanding for cognitive robotic tasks is provided.

In one aspect, a processor-implemented method of an ontology guided indoor scene understanding for cognitive robotic tasks is provided. The method includes one or more steps such as obtaining, via an input/output interface, at least one navigation command for a robot from a user as an input, capturing one or more images of a scene by the robot, wherein each of the one or more images is a combination of Red Green Blue (RGB) image and its corresponding depth image, identifying one or more objects within the scene using a combination of image processing techniques, comprising an object detection, a captioning, and an ontology validation, querying an ontology to determine one or more properties related to each of the one or more identified objects, selecting at least one image processing technique from the combination of image processing techniques based on the determined one or more properties of each of the one or more objects and representation of the ontology to extract one or more attributes and relations from the scene, generating at least one scene graph using the extracted one or more attributes and relations to aid the robot in executing at least one navigation command, and finally updating a knowledge graph representation of a knowledge base based on the generated scene graph to facilitate an effective interaction between the user and the robot, wherein the knowledge graph representation represents grounded representation. It is to be noted that the knowledgebase comprises of a global ontology graph, an instance connected scene graph of a predefined environment represented using a multi-graph data structure, and individual scene graph for each of the one or more scenes. The knowledgebase herein is updated by one of exploration by the robot, a dialogue exchange of the user with the robot, and an external knowledge sources using one of filtering techniques to complement the seed ontology built specifically for the robotic domain and indoor applications. Furthermore, there is provision for technique linking of objects in scene with image processing techniques, in order to use only suitable scene processing technique based on declaration in ontology to a specific object, environment and task. There is further provision for technique linking to tasks, or in other words, the task instruction will be processed to extract keywords that can be mapped to tasks possible in that environment and enabling runtime actuation execution calls.

In another aspect, a system is configured for an ontology guided indoor scene understanding for cognitive robotic tasks is provided. The system includes an input/output interface configured to obtain at least one navigation command for a robot from a user as an input, one or more hardware processors and at least one memory storing a plurality of instructions, wherein the one or more hardware processors are configured to execute the plurality of instructions stored in at least one memory.

Further, the system is configured to capture one or more images of a scene by the robot, wherein each of the one or more images is a combination of Red Green Blue (RGB) image and its corresponding depth image, identify one or more objects within the scene using a combination of image processing techniques, comprising an object detection, a captioning, and an ontology validation, querying an ontology to determine one or more properties related to each of the one or more identified objects. Further, the system is configured to select at least one image processing technique from the combination of image processing techniques based on the determined one or more properties of each of the one or more objects and representation of the ontology to extract one or more attributes and relations from the scene, generate at least one scene graph using the extracted one or more attributes and relations to aid the robot in executing at least one navigation command, and finally updates a knowledge graph representation of a knowledge base based on the generated scene graph to facilitate an effective interaction between the user and the robot, wherein the knowledge graph representation represents grounded representation. It is to be noted that the knowledgebase comprises of a global ontology graph, an instance connected scene graph of a predefined environment represented using a multi-graph data structure, and individual scene graph for each of the one or more scenes. The knowledgebase herein is updated by one of exploration by the robot, a dialogue exchange of the user with the robot, and an external knowledge sources using one of filtering techniques to complement the seed ontology built specifically for the robotic domain and indoor applications. Furthermore, there is provision for technique linking of objects in scene with image processing techniques, in order to use only suitable scene processing technique based on declaration in ontology to a specific object, environment and task. There is further provision for technique linking to tasks, or in other words, the task instruction will be processed to extract keywords that can be mapped to tasks possible in that environment and enabling runtime actuation execution calls.

In yet another aspect, one or more non-transitory machine-readable information storage mediums are provided comprising one or more instructions, which when executed by one or more hardware processors causes a method of an ontology guided indoor scene understanding for cognitive robotic tasks is provided. The method includes one or more steps such as obtaining, via an input/output interface, at least one navigation command for a robot from a user as an input, capturing one or more images of a scene by the robot, wherein each of the one or more images is a combination of Red Green Blue (RGB) image and its corresponding depth image, identifying one or more objects within the scene using a combination of image processing techniques, comprising an object detection, a captioning, and an ontology validation, querying an ontology to determine one or more properties related to each of the one or more identified objects, selecting at least one image processing technique from the combination of image processing techniques based on the determined one or more properties of each of the one or more objects and representation of the ontology to extract one or more attributes and relations from the scene, generating at least one scene graph using the extracted one or more attributes and relations to aid the robot in executing at least one navigation command, and finally updating a knowledge graph representation of a knowledge base based on the generated scene graph to facilitate an effective interaction between the user and the robot, wherein the knowledge graph representation represents grounded representation. It is to be noted that the knowledgebase comprises of a global ontology graph, an instance connected scene graph of a predefined environment represented using a multi-graph data structure, and individual scene graph for each of the one or more scenes. The knowledgebase herein is updated by one of exploration by the robot, a dialogue exchange of the user with the robot, and an external knowledge sources using one of filtering techniques to complement the seed ontology built specifically for the robotic domain and indoor applications. Furthermore, there is provision for technique linking of objects in scene with image processing techniques, in order to use only suitable scene processing technique based on declaration in ontology to a specific object, environment and task. As an example of technique linking, in the ontology for an object 'Television', the decision-making module will query the ontology to get the relevant properties like 'hasColor' and "hasShape' and fetch the corresponding technique link in to execute the image processing technique to detect the color and shape in the designated region in the image scene at runtime. There is further provision for technique linking to tasks, or in other words, the task instruction will be processed to extract keywords that can be mapped to tasks possible in that environment and enabling runtime actuation execution calls.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for ontology guided indoor scene understanding for cognitive robotic tasks. Herein, an ontology is updated online using external knowledge-base and observed information. This knowledge helps in semantic navigation, aids in speech, and text based human robot interactions. Further, in the process of performing the robotic tasks, the knowledgebase gets enriched, and the knowledge can be shared and used by other robots.

It is to be noted that when domain is limited like an indoor environment with limited number of possible objects, the decision making becomes much better equipped if the knowledge of the environment is grounded in an ontology that can be referenced for generation of semantic summary of scenes via scene graphs. This leads to reliable scene graphs that can be linked to external knowledge sources. Further, the scene graph generation is an ontology driven, hence chance of semantic errors at knowledge level is very low and processing also happens fast as only selective image processing techniques are run as per possible predicates and range of predicate values neglect erroneous output from image processing techniques.

Ontologies define the abstract concepts of a domain. The instances of the ontology form a knowledgebase that ensures semantic interoperability of the knowledge among various applications (can be developed independently by different developers) of the domain. Thus, the IEEE Standard Association's Robotics Society has formed Ontologies for Robotics and Automation (ORA) Working Group. Considering the diverse range and ever evolving robotics applications, the ontologies need to be amended over time. Also, given the ontologies, the knowledgebase needs to be created by instantiating the classes and their properties as defined in the ontology for the environment where the robot is operating. This process is either done manually or automatically by collecting sensor-based data. With the change of the environment, the knowledgebase needs to be updated continuously, which should ensure consistency and non-conflict with the existing knowledge.

Further, when a robot interacts with a human being, the given knowledge needs to be grounded, i.e., both should have similar interpretation of the environment. As the scope of human-robot interaction is increasing, this is becoming an active research domain to define ontologies and create knowledgebase that can facilitate effective interaction between a human and robot. Moreover, a lot of knowledge can be populated from the dialogue exchange with a human (explicit or implicit). There are some techniques to populate knowledge based on robot's sensor data, but no such work that enables people of grounded knowledge from spatial dialogue with a human-robot setting.

It would be appreciated that herein a two-way communication in terms of ontology access is used. The ontology is used to understand scene as well as spatial dialogue keyword references in order to carry out cognitive robotic tasks. Apart from this, the ontology and instance of scene graph is also refined by robotic exploration of the environment to learn property instances of objects, as well as direct linking through dialogue exchange with robot to know more about the world model.

It is to be noted that the prevalent approaches of knowledge base are to use some in memory knowledge without a formal definition of the knowledge representation. This poses a challenge in near future when these solutions need to be integrated to form a bigger solution. Thus, a standard way to represent the knowledge would ensure interoperability of various smaller solutions. Moreover, the scope of interacting with human (operator, coworker) are also increasing as there is growing trend of mix workforce. As a result, there should be a common understanding of knowledge not among various robotic sub-solutions, but between a human and robotic agent as well. Thus, knowledge representation should facilitate grounded representation. Now, any robotic environment is dynamic, and some information needs continuous update. Also, it may not be feasible to populate the entire knowledgebase before the deployment. Thus, there is a need to continuously update the knowledgebase with new/modified information.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
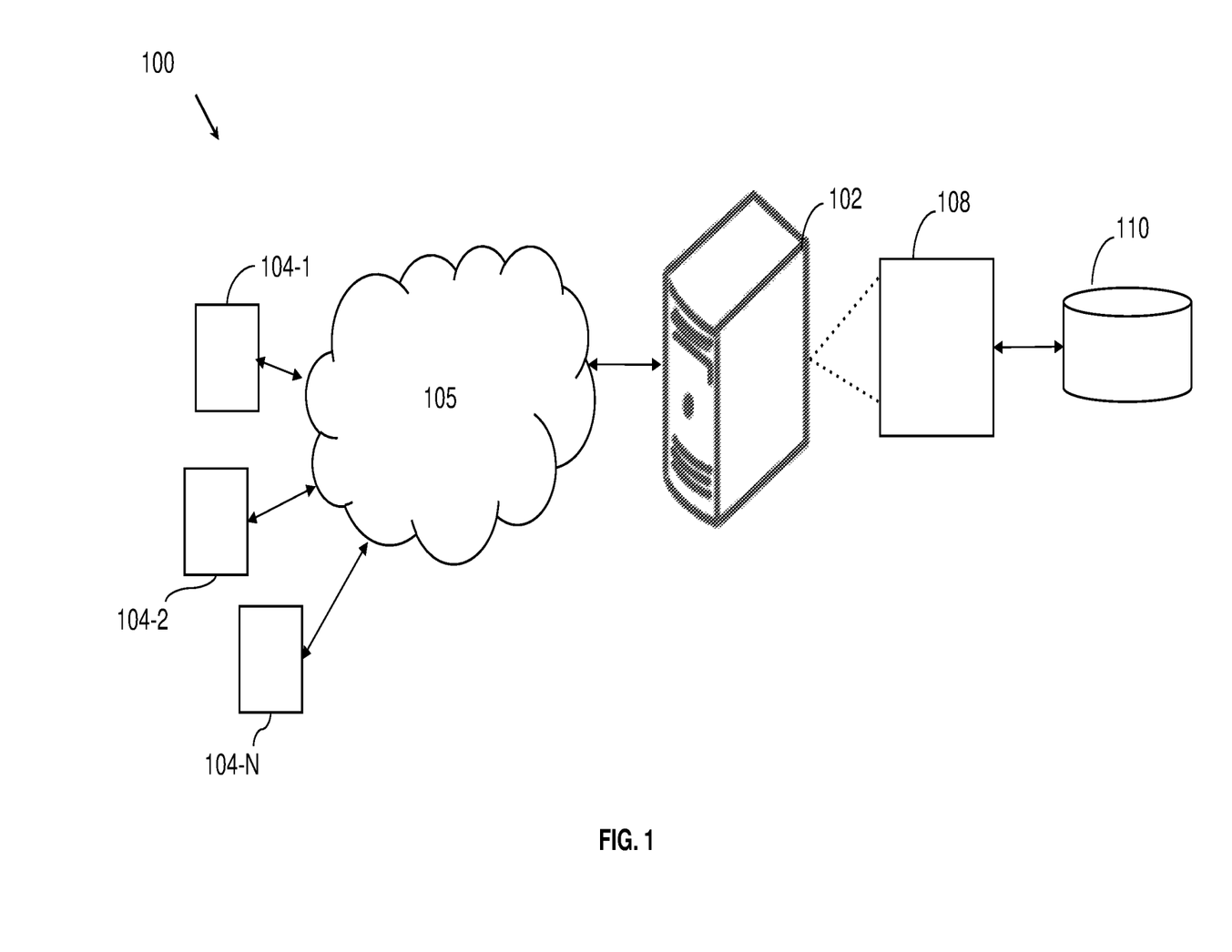
FIG. 1 illustrates a network diagram of an exemplary system for ontology guided indoor scene understanding for cognitive robotic tasks in accordance with some embodiments of the present disclosure.

FIG. 1 illustrates a block diagram of a system (100) for an ontology guided indoor scene understanding for cognitive robotic tasks, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory with a plurality of instructions, one or more databases (110), and one or more hardware processors (108) which are communicatively coupled with the at least one memory to execute a plurality of modules therein.

The one or more I/O interfaces (104) are configured to obtain at least one navigation command for a robot from a user as an input. The one or more I/O interfaces (104) are also configured to enable the user to update a knowledge graph representation of a knowledge base based on the generated scene graph to facilitate an effective interaction between the user and the robot The components and functionalities of the system (100) are described further in detail.

Figure 2:
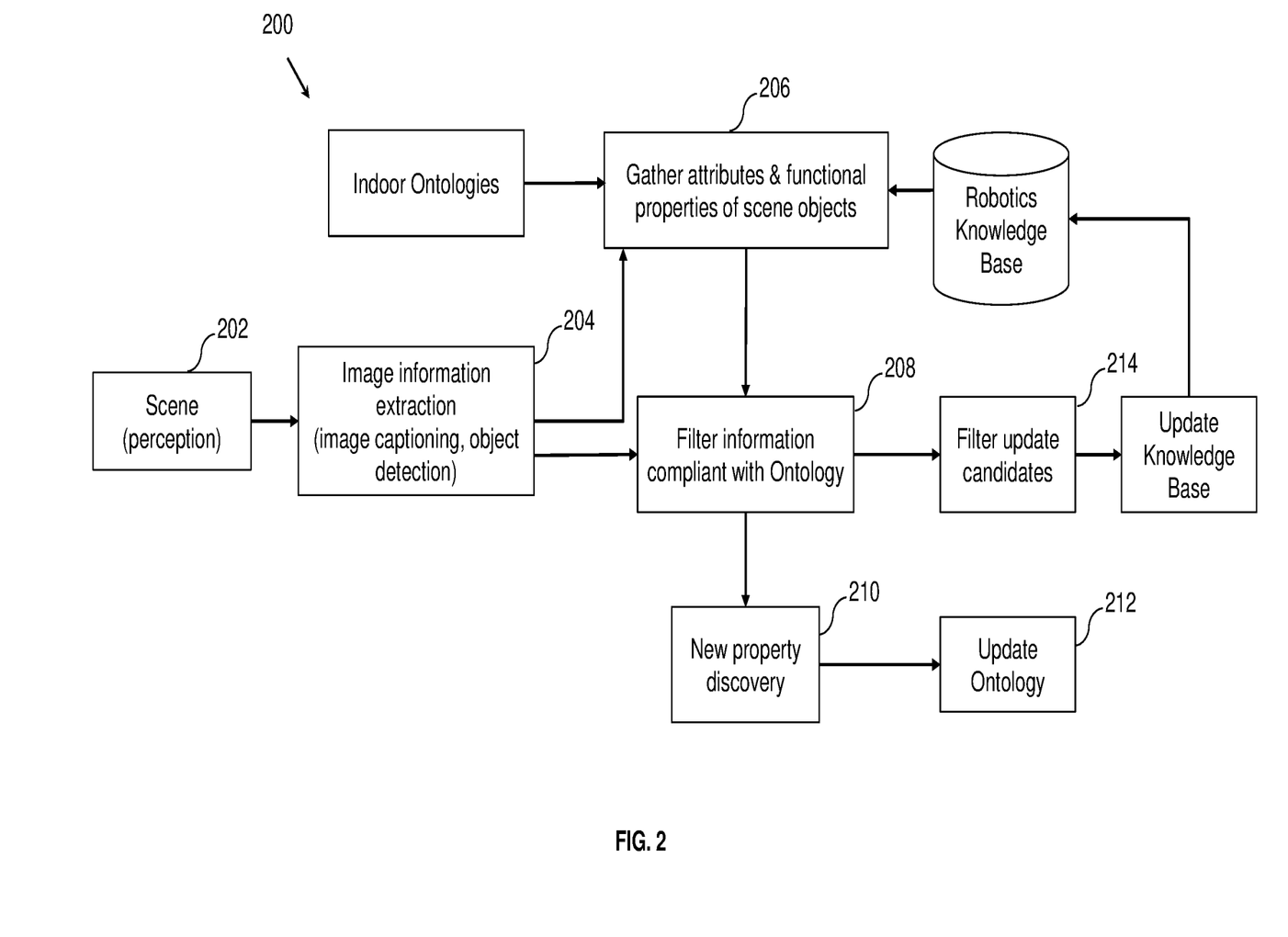
FIG. 2 illustrates a functional block diagram to illustrate the exemplary system in accordance with some embodiments of the present disclosure.

Referring FIG. 2, a functional block diagram (200) to illustrate the system (100), wherein the system (100) is configured to capture one or more Red Green Blue—Depth (RGB-D) images of a scene by the robot. Each of the RGB-D image is a combination of RGB image and its corresponding depth image. The depth image is an image channel in which each pixel relates to a distance between an image plane and a corresponding object in the RGB image. Further, the system identifies one or more objects within the scene using a combination of image processing techniques, comprising an object detection, a captioning, and an ontology validation (202).

Further, the system (100) is configured to query an ontology to determine one or more properties related to each of the one or more identified objects (202). It is to be noted the system (100) creates a robotic base ontology that align with existing ontologies. Then via a knowledge service, the corresponding requests for respective robotic tasks may be served. In turn, via perception processing, the knowledge may also get enhanced.

wherein for knowledge guided scene graph generation, the system (100) describe deep learning based image processing techniques to detect object and certain properties about the objects (206). To be able to interact with a human being (in natural language), a robot should be able to map human task instruction to its capability and referred objects to the environment. This process of grounding is enabled by a knowledge guided scene graph. The image processing techniques would provide a certain set of properties irrespective of the environment or the human agent. The knowledge guided (grounded) scene graph generation helps to bridge the gap that requires costly customization of the image processing techniques yet provide an easily customizable scene graph.

It is to be noted that the robot needs to understand where in an environment it is in and for input it has sensors like camera, depth sensor, microphone, infrared sensor, etc. Based on this sensing inputs, the robot may generate a scene graph, a graph containing objects in a scene and corresponding relationships of the objects. Traditional scene graphs have just nodes in the graph with some unnamed relations to it. However, in this case, because there is the ontology from where the objects detected by an object detection technique can be found and check for properties, the resultant scene graph contains relation edges that comes from the ontology validation itself (208).

Figure 3:
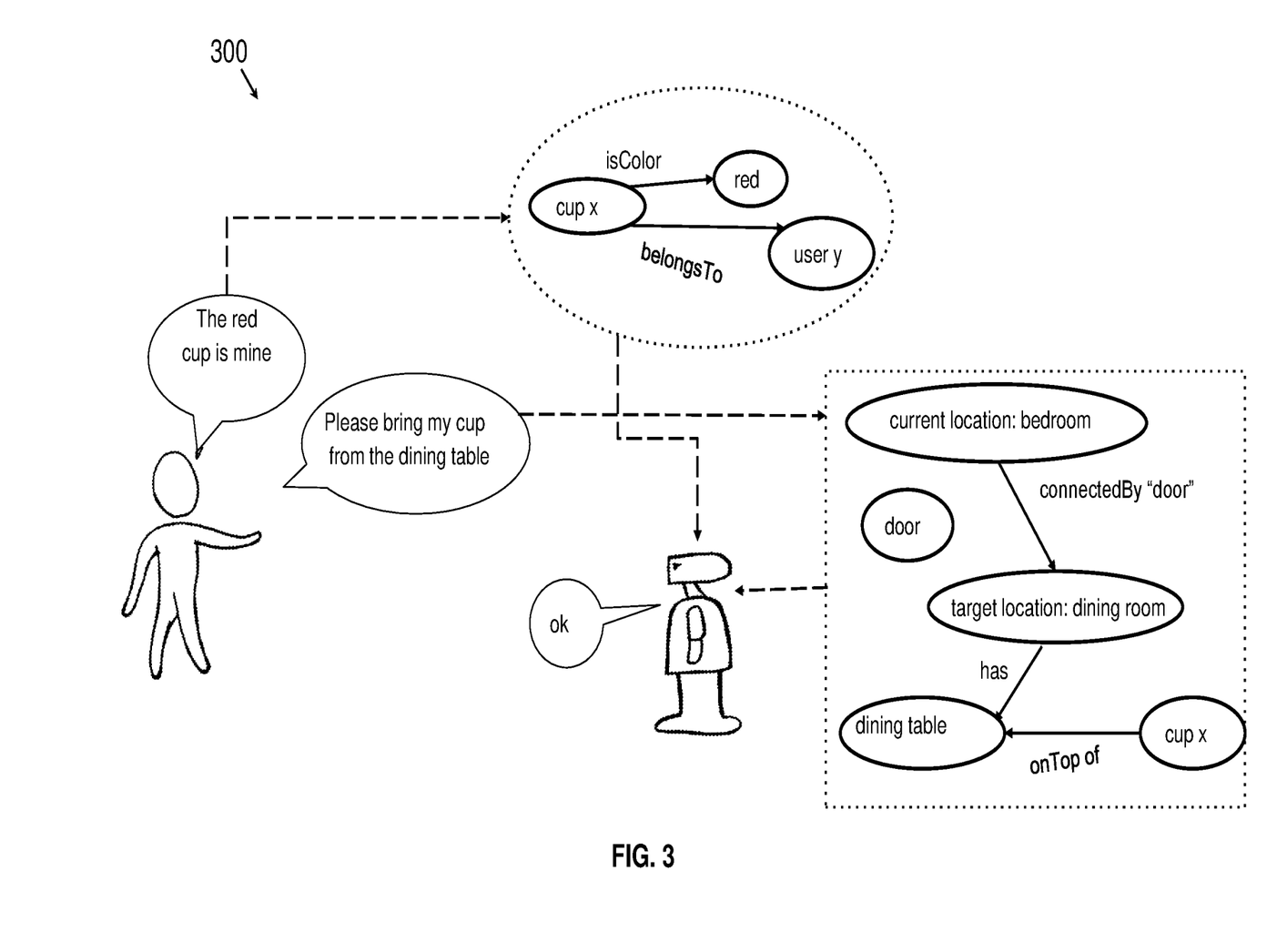
FIG. 3 is a schematic diagram to illustrating an example of the robot's decision making based on the knowledge base in accordance with some embodiments of the present disclosure.

Referring FIG. 3, a schematic diagram (300) to illustrate usage of knowledge semantics in dialogue and semantic navigation in one instruction in accordance with some embodiments of the present disclosure. Wherein if a 'cup' is detected as an object in an image scene processing, then the system (100) is configured to search ontology to find what relations does cup have with the scene. It sees that in ontology relations are size, color, on top of, near. Using image processing technique, the relevant mapping can be done. So accordingly based on whether actual relation exists in the ontology or not, the relations in scene can be searched and populated. Also, if using an image caption technique to generate caption relations for the images, there are usually wrong caption generations that are encountered. Hence using the ontology to check if the captions are correct or not can be a way out to make the scene graph logically consistent. As an example, if a caption generator says that "table is on top of cup", using ontology the reverse correct relation can be established by checking the direction of the edge between nodes. In the ontology, the relations can be directional (on top of) or bi-directional (near/proximity). This matching can be done by using a look up method whenever objects are found in the scene.

Further, the system (100) selects at least one image processing technique from the combination of image processing techniques based on the determined one or more properties of each of the one or more objects and representation of the ontology to extract one or more attributes and relations from the scene. It would be appreciated that given a generic image processing technique, the outcome of it may need to be processed further for particular application or requirement. This filtering requires a set of techniques for the process, which technique is applicable for a particular scenario is guided by the ontological representation (208).

There is provision for technique linking of objects in scene with image processing techniques, in order to use only suitable scene processing techniques based on declaration in ontology to a specific object, environment and task. There is further provision for technique linking to tasks, or in other words, the task instruction may be processed to extract keywords that can be mapped to tasks possible in that environment and enabling runtime actuation execution calls. As an example of technique linking, in the ontology for an object 'Television', the decision-making module will query the ontology to get the relevant properties like 'hasColor' and "hasShape' and fetch the corresponding technique link in to execute the image processing technique to detect the color and shape in the designated region in the image scene at runtime.

In another example, wherein for the "red cup" instruction, when the object is detected as 'cup', from ontology lookup, the object properties relevant to the object 'cup' is fetched. Color is one such property mentioned in ontology. Further, the system is configured to invoke a technique to detect color, that uses image pixel processing. This invocation is done by a path stored in the ontology, so that when 'color' property is activated, the corresponding technique mapped to it is called and the result is checked within the range of colors.

In this way, instead of calling each type of feature technique for each and every object, only the relevant ones are called based on filtering on two conditions (210): a) whether the object has features (edge connected nodes) that are relevant for it, b) the feature set relevant for the given instruction. As an example, to detect 'red cup' as per instruction as soon as the keywords are processed, 'red' is marked as color, 'cup' is an indoor object. Then, the technique to detect 'red' feature is called from technique mapping stored in the ontology and at runtime processing happens to give output. If cup found in scene is 'blue', then it can be inferred that this is a 'blue' cup. Similarly, for another object 'TV', the color is always black when off and random when on, a shape detector technique to output 'rectangle within rectangle' can be called to check if it is indeed a 'TV' instead of a picture frame. Similarly based on color, 'TV' and window can be disambiguated.

In another embodiment, the system (100) is configured to generate at least one scene graph using the extracted one or more attributes and relations to aid the robot in executing at least one navigation command. The generated at least one scene graph is used to update a knowledge graph representation of a knowledge base to facilitate an effective interaction between the user and the robot (214).

In another aspect, wherein the user is stating facts about the environment explicitly or implicitly during other conversation is a good source of knowledge. The system (100) extracts knowledge from the dialogue with the user, filter it according to the knowledge representation structure, and then store it in the knowledgebase. The keywords are checked with ontology for possible existing entries in the knowledgebase itself, and new information is added based on a confidence estimation technique.

In another example, wherein the information that 'cup is mine' may result in knowledge that 'cup' as an object belongs to owner 'user X', as each object of personal type will have an owner. This information can be learnt via a dialogue. Also, in some cases, an object may have a property instance that is not getting detected or is a new property altogether. That can be added based on user confirmation—like 'cup' is of 'gray' color, or 'cup' has property of 'handle' like a mug, this information was not there earlier in the ontology. This happens by using finding nodes matching the keywords and creating new nodes of property values in case of specific indoor scene; or new edge properties like 'cup' has component 'handle'.

It would be appreciated that the knowledge graph representation facilitates grounded representation. The knowledgebase comprises of a global ontology graph, an instance connected scene graph of a predefined environment represented using a multi-graph data structure, and individual scene graph for each of the one or more scenes (216). Further, the knowledgebase is updated by one of exploration by the robot, a dialogue exchange of the user with the robot, and an external knowledge sources using one of filtering techniques to complement the seed ontology built specifically for the robotic domain and indoor applications.

In another example, wherein if it is found that an object lies in an odd location for that particular environment, then the same is updated as a special instance case. Like, 'oven' is lying in 'living room' instead of kitchen. This special instance can be updated in the scene graph of that environment if that is the practice and later it can be used accordingly. Also, if there is a general property found, that is also added if the frequency of occurrence is generic enough in multiple environments. Like, 'glass' can contain 'water' after disambiguation of glass as an object (not an element) and if water is detected around glass in multiple scenes, then by inferencing (reasoning) to find the cause, this relation can be established, which was not there in the ontology beforehand.

Moreover, a global knowledgebase which can be shared across multiple robots and software services as a query service. The global knowledge graph is used for cognitive robotics tasks such as and not limited to manipulation, navigation, dialogue exchange; and the global knowledge graph is updated based on inputs derived from feedback of scene exploration by robot, manipulation of objects and new knowledge mining using dialogue exchange and optionally external knowledge sources in graph compliant format.

Figure 4:
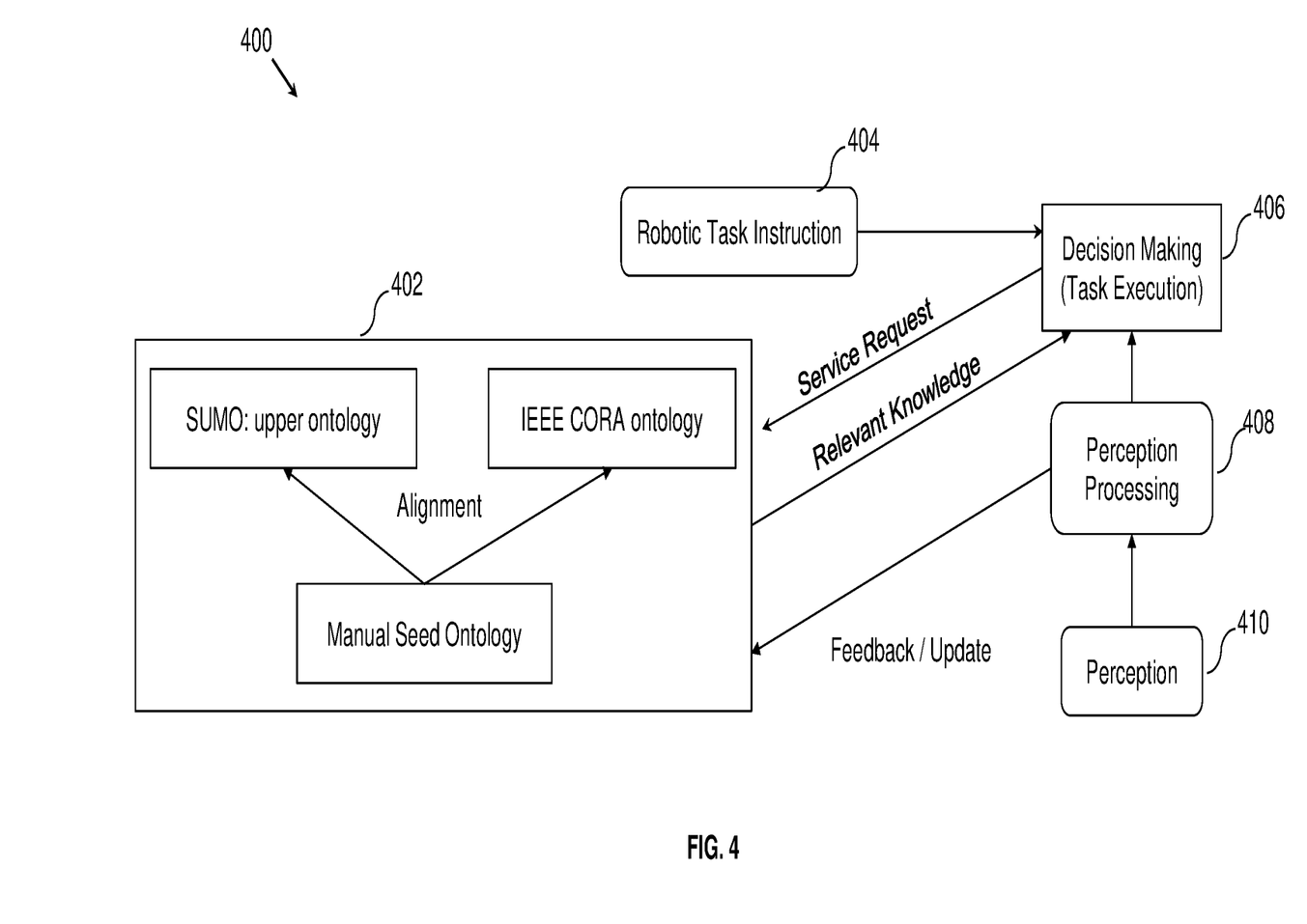
FIG. 4 illustrates a functional block diagram to illustrate ontology extension and population in accordance with some embodiments of the present disclosure.

Referring FIG. 4, a functional block diagram (400) to illustrate ontology extension and population in accordance with some embodiments of the present disclosure. Initially, a seed ontology is created manually by declaring concepts relevant to the robotic domain and the indoor environment that comprises of commonly occurring objects and their object properties (like color) along with inter object properties (like proximity relation) (402). This ontology is aligned with a standard Suggested Upper Merged Ontology (SUMO) to make it semantic web coherence compliant and also with an abstract Core Ontology for Robotics and Automation (CORA) to make it compliant with acceptable robotic standardization. When a task instruction is given to the robot (404), the robot used perception information to make sense of where it is and what is sensed (like visible in camera sensor) (406) and then based on task instruction type and current scene analysis requests the knowledgebase to get relevant information in form a service call (408). The ontology can also be updated or refined as a service if perception processing entails new generic information not earlier there in the ontology (410).

In another embodiment, a granular knowledgebase is developed for the robot that complies to the known standards of robotics ontology definition. This in turn ensures that the knowledge stored using this representation can be usable by any application who understanding the definition of the representation. The knowledge representation enables easy update of the existing data and it supports grounded representation of the knowledge with semantically rich information. This ensures usability of it in human-robot interaction scenario. The knowledge format is multi-graph, which is generic to support subject-predicate-object relations in form of node-edge-node. This specific choice of format allows multiple edge instances between two nodes as well as edge properties. This is useful if the user wishes to map it to a Planning Domain Definition Language (PDDL), well graph network analysis, and forming queries on SPARQL. The graph has options of direction embedded in the property as an example 'proximity' is a bi-directional property whereas the 'hasColor' is a unidirectional property.

Figure 5:
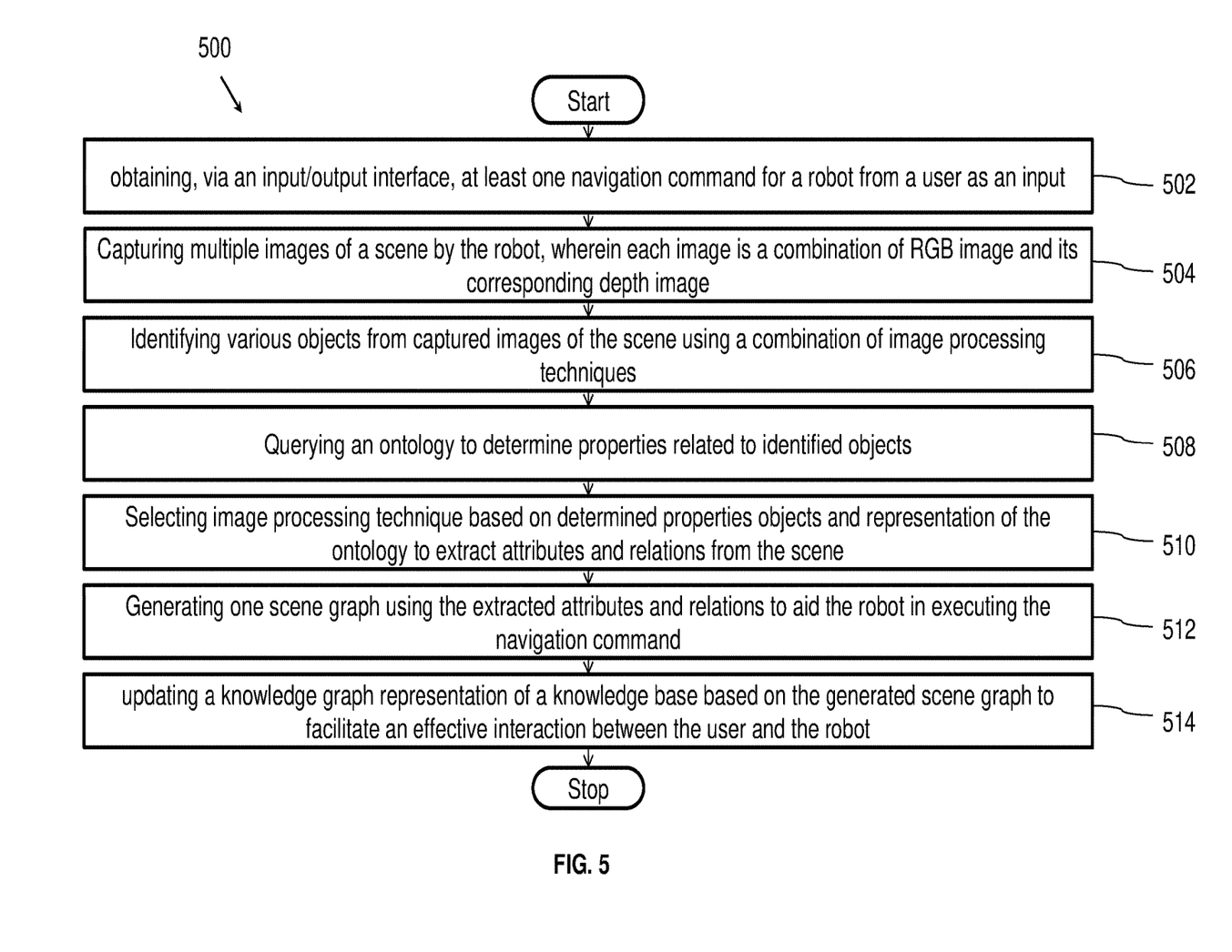
FIG. 5 is a flow diagram to illustrate a method of ontology guided indoor scene understanding for cognitive robotic tasks in accordance with some embodiments of the present disclosure.

Referring FIG. 5, to illustrate a flowchart (500), for an ontology guided indoor scene understanding for cognitive robotic tasks, in accordance with an example embodiment. Initially, at the step (502), obtaining, via an input/output interface, at least one navigation command for a robot from a user as an input.

At the next step (504), capturing one or more images of a scene by the robot, wherein each of the one or more images is a combination of Red Green Blue (RGB) image and its corresponding depth image.

At the next step (506), identifying one or more objects within the scene using a combination of image processing techniques, comprising an object detection, a captioning, and an ontology validation.

At the next step (508), querying an ontology to determine one or more properties related to each of the one or more identified objects.

At the next step (510), selecting at least one image processing technique from the combination of image processing techniques based on the determined one or more properties of each of the one or more objects and representation of the ontology to extract one or more attributes and relations from the scene.

At the next step (512), generating at least one scene graph using the extracted one or more attributes and relations to aid the robot in executing at least one navigation command.

At the last step (514), updating a knowledge graph representation of a knowledge base based on the generated scene graph to facilitate an effective interaction between the user and the robot, wherein the knowledge graph representation facilitates grounded representation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem in cognitive robotics applications of building specific applications for specific use cases. However, the knowledge of the world and the semantics are common for a robot for multiple tasks. In this disclosure, to enable usage of knowledge across multiple scenarios, a method and system for ontology guided indoor scene understanding for cognitive robotic tasks is described where in scenes are processed based on techniques filtered based on querying ontology with relevant objects in perceived scene to generate a semantically rich scene graph. Herein, an initially manually created ontology is updated and refined in online fashion using external knowledge-base, human robot interaction and observed information. This knowledge helps in semantic navigation, aids in speech, and text based human robot interactions. Further, in the process of performing the robotic tasks, the knowledgebase gets enriched and the knowledge can be shared and used by other robots.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
   obtaining, via an input/output interface, at least one navigation command for a robot from a user as an input;
   capturing, via one or more hardware processors, one or more images of a scene by the robot, wherein each of the one or more images is a combination of Red Green Blue (RGB) images and their corresponding depth images;
   identifying, via the one or more hardware processors, one or more objects within the scene using a combination of image processing techniques, wherein the image processing techniques comprising an object detection technique, a captioning technique, and an ontology validation technique;
   querying, via the one or more hardware processors, an ontology to determine one or more properties related to each of the one or more identified objects;
   selecting, via the one or more hardware processors, at least one image processing technique from the combination of image processing techniques based on the determined one or more properties of each of the one or more objects and representation of the ontology to extract one or more attributes and relations from the scene;
   generating, via the one or more hardware processors, at least one scene graph using the extracted one or more attributes and relations to aid the robot in executing at least one navigation command; and
   updating, via the one or more hardware processors, a knowledge graph representation of a knowledge base based on the generated scene graph to facilitate an effective interaction between the user and the robot, wherein the knowledge graph representation represents a grounded representation.

2. The processor-implemented method of claim 1, further comprising a global knowledge base shared across a plurality of robots and software services as a query service.

3. The processor-implemented method of claim 1, wherein the depth image is an image channel in which each pixel relates to a distance between an image plane and a corresponding object in the RGB image.

4. The processor-implemented method of claim 2, wherein the global knowledge base comprises a global ontology graph, an instance connected scene graph of a predefined environment represented using a multi-graph data structure, and an individual scene graph for each of the one or more scenes.

5. The processor-implemented method of claim 1, wherein the knowledge base is updated by one of exploration by the robot, a dialogue exchange of the user with the robot, and an external knowledge source using one of a plurality of filtering techniques to complement a seed ontology built specifically for the robotic domain and indoor applications.

6. The processor-implemented method of claim 1, wherein the scene graph generation using image processing techniques is validated by object-property relations and range of values declared in the ontology.

7. The processor-implemented method of claim 2, wherein a global knowledge graph of the global knowledge base is used for cognitive robotics tasks, wherein the cognitive robotics tasks include manipulation, navigation, and dialogue exchange.

8. The processor-implemented method of claim 1, wherein the knowledge graph representation is updated based on inputs derived from feedback of scene exploration by the robot, manipulation of one or more objects and a new knowledge mining using the dialogue exchange and optionally external knowledge sources in graph compliant format.

9. A system comprising:
an input/output interface to obtain at least one navigation command for a robot from a user as an input;
one or more hardware processors;
a memory in communication with the one or more hardware processors, wherein the one or more hardware processors are configured to execute programmed instructions stored in the memory, to:
  capture one or more images of a scene by the robot, wherein each of the one or more images is a combination of Red Green Blue (RGB) images and their corresponding depth image;
  identify one or more objects within the scene using a combination of image processing techniques, wherein the image processing techniques comprising an object detection technique, a captioning technique, and an ontology validation technique;
  query an ontology to determine one or more properties related to each of the one or more identified objects;
  select at least one image processing technique from the combination of image processing techniques based on the determined one or more properties of each of the one or more objects and representation of the ontology to extract one or more attributes and relations from the scene;
  generate at least one scene graph using the extracted one or more attributes and relations to aid the robot in executing at least one navigation command; and
  update a knowledge graph representation of a knowledge base based on the generated scene graph to facilitate an effective interaction between the user and the robot, wherein the knowledge graph representation represents a grounded representation.

10. The system of claim 9, further comprising a global knowledge base shared across a plurality of robots and software services as a query service.

11. The system of claim 9, wherein the depth image is an image channel in which each pixel relates to a distance between an image plane and a corresponding object in the RGB image.

12. The system of claim 10, wherein the global knowledge base comprises a global ontology graph, an instance connected scene graph of a predefined environment represented using a multi-graph data structure, and an individual scene graph for each of the one or more scenes.

13. The system of claim 9, wherein the knowledge base is updated by one of exploration by the robot, a dialogue exchange of the user with the robot, and an external knowledge source using one of filtering techniques to complement a seed ontology built specifically for the robotic domain and indoor applications.

14. The system of claim 9, wherein the scene graph generation using image processing techniques is validated by object-property relations and range of values declared in the ontology.

15. A non-transitory computer readable medium storing one or more instructions which when executed by one or more processors on a system, cause the one or more processors to perform method comprising:
obtaining, via an input/output interface, at least one navigation command for a robot from a user as an input;
capturing, via one or more hardware processors, one or more images of a scene by the robot, wherein each of the one or more images is a combination of Red Green Blue (RGB) image and its corresponding depth image;
identifying, via the one or more hardware processors, one or more objects within the scene using a combination of image processing techniques, comprising an object detection, a captioning, and an ontology validation;
querying, via the one or more hardware processors, an ontology to determine one or more properties related to each of the one or more identified objects;
selecting, via the one or more hardware processors, at least one image processing technique from the combination of image processing techniques based on the determined one or more properties of each of the one or more objects and representation of the ontology to extract one or more attributes and relations from the scene;
generating, via the one or more hardware processors, at least one scene graph using the extracted one or more attributes and relations to aid the robot in executing at least one navigation command; and
updating, via the one or more hardware processors, a knowledge graph representation of a knowledge base based on the generated scene graph to facilitate an effective interaction between the user and the robot, wherein the knowledge graph representation represents a grounded representation.

* * * * *